April 27, 1965  T. A. ST. CLAIR  3,180,145
GAS METER DIAPHRAGM HAVING SNAP-ON GASKET
Filed Aug. 12, 1963
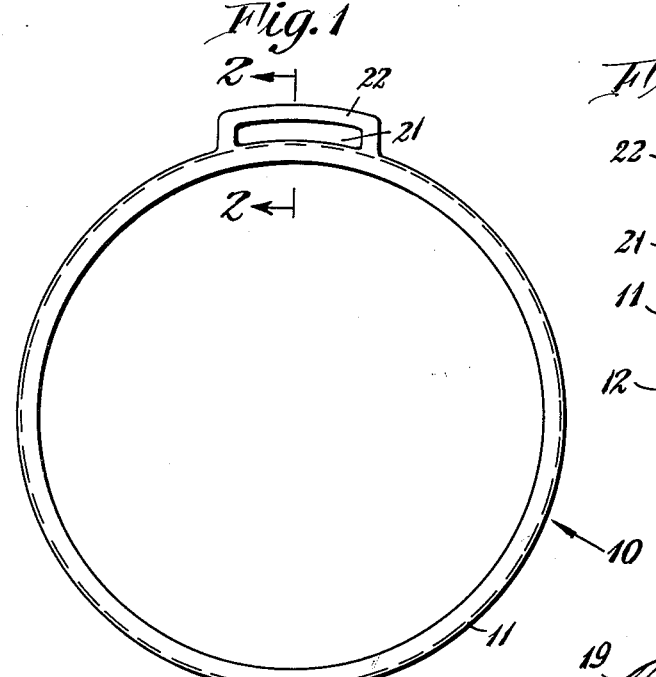
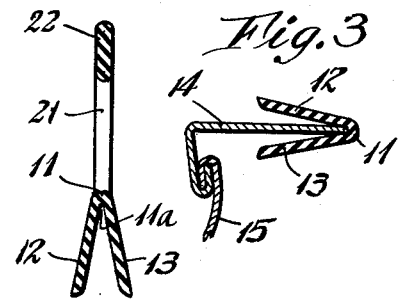
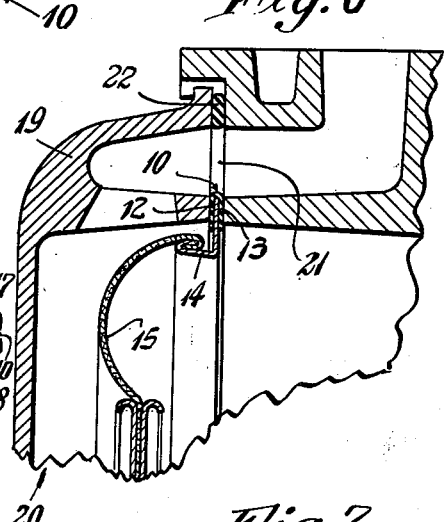
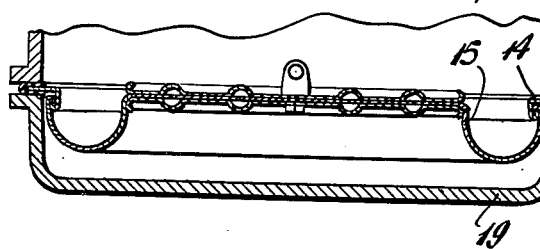
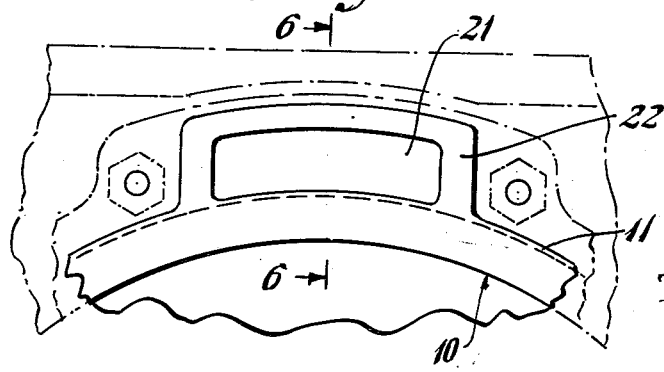
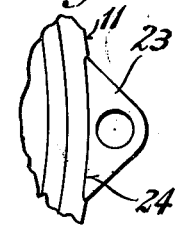
INVENTOR.
Theodore A. St. Clair
BY
Johnson and Kline
ATTORNEYS

United States Patent Office 3,180,145
Patented Apr. 27, 1965

3,180,145
GAS METER DIAPHRAGM HAVING
SNAP-ON GASKET
Theodore A. St. Clair, Fairfield, Conn., assignor to Textron Inc., Providence, R.I., a corporation of Rhode Island
Filed Aug. 12, 1963, Ser. No. 301,426
6 Claims. (Cl. 73—278)

The present invention relates to pressure sealing means for sealing flange-type gas meter diaphragms in which the diaphragm flange is disposed between the main body and diaphragm covers of a gas meter, and more particularly to a novel snap-on sealing gasket.

Heretofore, diaphragm flanges have been sealed with two separate, annular die cut gaskets. This has been costly because of the waste involved since the center section was lost. Also, the material, being very thin and flimsy, was difficult to handle and had poor sealing qualities because the thickness could only be constant and could not be varied in different areas to suit the sealing requirement. Also, such seals were inefficient in sealing qualities because of the additional surfaces which had to be sealed, namely, the surface between the body and the flange and the flange and cover section, providing four sealing surfaces.

The present invention overcomes these difficulties by providing a novel gasket which is molded as an annular member with a U-shaped cross-section and preferably with an integral cross-over port seal such as required. The gaskets which are made of elastomeric material, such as ruber, synthetic rubber or thermoplastic resins or the like elastic material, are molded as unitary structures forming the entire sealing means provided with uniform surfaces and yet are resilient enough to adapt themselves to variations in the sealing requirements for effecting a seal at the flange connection.

A feature of the invention resides in the fact that the snap-on gasket can be made in a relatively inexpensive and rapid manner by molding a plurality of gaskets in the form of bellows which are sliced through the trough of the bellows to provide individual gaskets so that there is no waste and considerable saving.

Since the gasket is a unitary structure, it eliminates the chance of leakage at the two faces thereof which engage the metal flange on the diaphragm and greatly improves the sealing properties.

Another feature of the invention resides in the fact that the resiliency of the gasket material permits it to be easily streached over the diaphragm flange and snapped into position in which it is effectively held in place. When the gasket is stretched into position over the flange, it will accommodate itself to minor size variations in the blanked metal diaphragm flange and insure a good seal. If desired, the flange may be provided with projecting guide ears for assisting in locating the diaphragm in its position in the meter. In such a case the edge or base of the U is severed or slit for a distance equal to the guide ears to receive the guide ears.

Other features and advantages of the invention will be apparent from the specification and claims when considered in connection with the accompanying drawings in which:

FIGURE 1 shows a plan view of the sealing gasket.
FIG. 2 is a sectional view on lines 2—2 of FIG. 3.
FIG. 3 is a fragmentary sectional view of the gasket being placed on the flange, showing the edge of the flange tightly engaging the inner wall of the flange at the base of the U-shaped section.
FIG. 4 shows the flange in position with the sealing gasket disposed thereon between the main body and cover of the meter.

FIG. 5 is a view showing the cross-over port seal projecting from the edge of the gasket.
FIG. 6 is a sectional view taken along lines 6—6 of FIG. 5.
FIG. 7 is a fragmentary view showing a guiding ear projecting through the slit in the gasket.

Shown in FIG. 1 is the novel snap-on gasket 10 embodying the present invention. This gasket is molded from an elastomeric material into a body of annular form and has a U-shaped cross-section, as shown in FIG. 2, with the base 11 of the U forming the periphery of the gasket and the legs 12, 13 of the U extending inwardly therefrom so as to overlie the opposite faces of a metal mounting flange 14 for a diaphragm 15 for a gas meter. As shown in FIG. 4, the diaphragm 15 extends over the opening in a main body 16 and is clamped between a flange 17 on the main body and a flange 18 on a diaphragm cover 19 of a gas meter 20.

The flange 14, according to the present invention, is formed as a circular metal stamping. The inner diameter 11a of the base of the U of the gasket is slightly smaller than the exterior diameter of the metal flange and, being of a resilient material, the gasket can be stretched to permit the flange 14 to be inserted between the legs 12, 13 of the U and into engagement with the base of the U as shown in FIG. 3. By its elasticity, it grips the edge of the metal flange and accurately locates the gasket thereon, with the legs 12, 13 of the U overlying the opposite faces of the diaphragm flange.

Thus, it will be seen that the gasket provides a secure seal for enclosing the metal flange and provides resilient surfaces for engagement by the main body and cover flanges to effect a secure sealing of the gas meter.

In many gas meters there is provided in the main portion of the meter a cross-over port 21 separate and spaced from the edge of the opening closed by the diaphragm. Heretofore, the prior diaphragm metallic flanges have been provided with an extension at this point so as to surround the port and provide a support for a sealing gasket. With the present invention, however, since the molded gasket can be molded with variations in thickness, the gasket structure can be provided with an integral cross-port sealing gasket portion 22. This portion is capable of sealing the port, as shown in FIGS. 6 and 7, since the cross-port gasket is of the required thickness to fill the space surrounding the port. Because it is an integral part of the gasket it is readily controlled in its placement even though there is no metal flange disposed therein. While the sealing portion for the cross-over port can be formed as a pad and the required hole blanked out, it is preferred that the cross-over port gasket 22 be formed during the molding of the gasket so that additional operations are not necessary to provide this seal.

In some instances it is desired to provide the metal flange with projecting guide ears 23, as shown in FIG. 7, for guiding in the location of the diaphragm and insuring its proper position in the meter. When such guiding ears are required, it is a simple matter to accommodate them with the novel gasket of the present invention since it is merely necessary to provide a slit 24 in the base of the U at the point where the guide ears are located to receive the guide ears upon proper stretching of the gasket.

The gasket can be installed on the diaphragm so as to become a component part thereof and sold therewith or can be provided as a separate element and applied at the time the diaphragm is being installed.

Variations and modifications may be made within the scope of the claims and portions of the improvements may be used without others.

I claim:
1. A gas meter diaphragm having a snap-on gasket of synthetic rubber material for sealing a flat annular metal flange on the diaphragm and adapted to be disposed between the main body and diaphragm covers of a gas meter, said gasket comprising an annular member of U-shaped cross-section having an internal diameter at the base of the U slightly less than the external diameter of said metal flange, said gasket being stretched and snapped over the flange with said internal diameter pressed against the edge of the flange and with the legs of the U overlying the sides of the flange in position to be clamped between said metal flange and the main body and cover respectively.

2. A gas meter diaphragm having a snap-on gasket of synthetic rubber material for sealing a flat annular metal flange on the diaphragm and adapted to be disposed between the main body and diaphragm covers of a gas meter, said gasket comprising an annular member of U-shaped cross section having an internal diameter at the base of the U slightly less than the external diameter of said metal flange, said gasket being stretched and snapped over the flange with said internal diameter pressed against the edge of the flange and with the legs of the U overlying the sides of the flange in position to be clamped between said metal flange and the main body and cover respectively, said metal flange having guiding ears projecting beyond the periphery thereof and said gasket having slits in the base to receive said guiding ears.

3. A gas meter diaphragm having a snap-on gasket of elastomeric material for sealing an annular metal flange disposed between the main body and diaphragm covers of a gas meter having a separate cross-over port, said gasket comprising an annular member of U-shaped cross-section having an internal diameter at the base of the U slightly less than the external diameter of said metal flange, said gasket being stretched and snapped over the flange with said internal diameter pressed against the edge of the flange with the legs of the U overlying the sides of the flange, and an integral cross-over port seal projecting from the periphery of said annular member.

4. A snap-on gasket of elastomeric material for sealing a gas meter diaphragm having an annular metal flange disposed between the main body and diaphragm covers of a gas meter having a separate cross-over port, comprising an annular member of U-shaped cross-section having an internal diameter at the base of the U which is slightly less than the external diameter of said metal flange, said gasket being adapted to be stretched and snapped over the flange with said internal diameter pressed against the edge of the flange and with the legs of the U overlying the sides of the flange, and an integral cross-over port seal projecting from the periphery of said annular member and being in the plane of and of the same thickness as said annular member.

5. A snap-on gasket of elastomeric material for sealing a gas meter diaphragm having an annular metal flange provided with projecting guiding ears and disposed between the main body and diaphragm covers of a gas meter, comprising an annular member of U-shaped cross-section having an internal diameter at the base of the U slightly less than the external diameter of said metal flange, said gasket having slits in the periphery extending through the base of the U to receive said guiding ears and being adapted to be stretched and snapped over the flange with said internal diameter pressed against the edge of the flange with the legs of the U overlying the sides of the flange in position to be clamped between said metal flange and the main body and cover respectively.

6. A snap-on gasket of elastomeric material for sealing a gas meter diaphragm having a flat annular metal flange provided with opposed projecting guiding ears and disposed between the main body and diaphragm covers of a gas meter having a separate cross-over port, comprising an annular member of U-shaped cross-section having an internal diameter at the base of the U slightly less than the external diameter of said metal flange, said gasket having slits in the periphery extending through the base of the U to receive said guiding ears and being adapted to be stretched and snapped over the flange with said internal diameter pressed against the edge of the flange and with the legs of the U overlying the sides of the flange, and an integral cross-over port seal projecting from the periphery of said annular member and being in the plane of and of the same thickness as said annular member.

References Cited by the Examiner
UNITED STATES PATENTS
2,264,028 11/41 Molden _____ 73—278
3,085,425 4/63 Roman _____ 73—61

FOREIGN PATENTS
511,472 6/52 Belgium.

RICHARD C. QUEISSER, *Primary Examiner.*
DAVID SCHONBERG, *Examiner.*